(12) United States Patent
Oskarsson et al.

(10) Patent No.: US 11,650,787 B2
(45) Date of Patent: *May 16, 2023

(54) MEDIA CONTENT IDENTIFICATION AND PLAYBACK

(71) Applicant: Spotify AB, Stockholm (SE)

(72) Inventors: Johan Oskarsson, Stockholm (SE); Christopher Swanson, Stockholm (SE)

(73) Assignee: Spotify AB, Stockholm (SE)

( * ) Notice: Subject to any disclaimer, the term of this patent is extended or adjusted under 35 U.S.C. 154(b) by 91 days.

This patent is subject to a terminal disclaimer.

(21) Appl. No.: 17/205,323

(22) Filed: Mar. 18, 2021

(65) Prior Publication Data
US 2021/0294564 A1 Sep. 23, 2021

Related U.S. Application Data

(63) Continuation of application No. 16/222,347, filed on Dec. 17, 2018, now Pat. No. 10,976,988, which is a
(Continued)

(51) Int. Cl.
| | |
|---|---|
| *G06F 3/16* | (2006.01) |
| *H04L 65/60* | (2022.01) |
| *G10L 19/018* | (2013.01) |
| *G06F 16/638* | (2019.01) |
| *G06F 16/683* | (2019.01) |
| *G06F 16/68* | (2019.01) |
| *G06F 16/632* | (2019.01) |
| *G10L 25/54* | (2013.01) |

(52) U.S. Cl.
CPC ............ *G06F 3/165* (2013.01); *G06F 16/634* (2019.01); *G06F 16/639* (2019.01); *G06F 16/683* (2019.01); *G06F 16/686* (2019.01); *G10L 19/018* (2013.01); *H04L 65/60* (2013.01); *G06F 3/167* (2013.01); *G10L 25/54* (2013.01)

(58) Field of Classification Search
CPC ...... G06F 3/165; G06F 16/683; G06F 16/634; G06F 16/686; G06F 16/639; G06F 3/167; G10L 19/018; G10L 25/54; H04L 65/60
See application file for complete search history.

(56) References Cited

U.S. PATENT DOCUMENTS

| | | | |
|---|---|---|---|
| 9,691,378 B1 * | 6/2017 | Meyers | ................ G10L 21/028 |
| 10,185,538 B2 | 1/2019 | Oskarsson | |

(Continued)

OTHER PUBLICATIONS

"Shazam (company)", Wikipedia, The Free Encyclopedia, retrieved Sep. 28, 2017. Available Online at: https://en.wikipedia.org/wiki/Shazam_(company).

*Primary Examiner* — Fan S Tsang
*Assistant Examiner* — David Siegel
(74) *Attorney, Agent, or Firm* — Merchant & Gould P.C.

(57) ABSTRACT

Systems, devices, apparatuses, components, methods, and techniques for identifying and playing media content are provided. An example media-playback device for identifying and playing media content for a user traveling in a vehicle includes an audio identification engine and a media playback engine. Audio content is recorded and identified by comparison to media content databases. The audio content is identified and immediately played on the same device. Additional media content is selected for playback based on user listening preferences.

20 Claims, 14 Drawing Sheets

Related U.S. Application Data continuation of application No. 15/721,049, filed on Sep. 29, 2017, now Pat. No. 10,185,538.

(60) Provisional application No. 62/441,267, filed on Dec. 31, 2016.

(56) References Cited

U.S. PATENT DOCUMENTS

| | | |
|---|---|---|
| 10,976,988 B2 | 4/2021 | Oskarsson |
| 2008/0188964 A1 | 8/2008 | Bech et al. |
| 2009/0034750 A1 | 2/2009 | Ayoub et al. |
| 2013/0339384 A1 | 12/2013 | Waites |
| 2014/0074846 A1* | 3/2014 | Moss ............... G06F 16/639 707/740 |
| 2015/0106394 A1 | 4/2015 | Otto |
| 2015/0128039 A1 | 5/2015 | Wieder |
| 2016/0314794 A1* | 10/2016 | Leitman ............ H04N 21/2387 |

\* cited by examiner

MEDIA CONTENT IDENTIFICATION AND PLAYBACK

CROSS-REFERENCE TO RELATED APPLICATIONS

This application is a Continuation of U.S. application Ser. No. 16/222,347, filed on Dec. 17, 2018, titled MEDIA CONTENT IDENTIFICATION AND PLAYBACK, which is a Continuation of U.S. application Ser. No. 15/721,049, filed on Sep. 29, 2017, issued as U.S. Pat. No. 10,185,538, titled MEDIA CONTENT IDENTIFICATION AND PLAYBACK, which claims priority to U.S. Application No. 62/441,267, filed on Dec. 31, 2016, titled MEDIA CONTENT IDENTIFICATION AND PLAYBACK, the disclosures of which are hereby incorporated by reference in their entireties. To the extent appropriate a claim of priority is made to each of the above-disclosed applications.

BACKGROUND

Many people enjoy consuming media content while travelling or during other activities. The media content can include audio content, video content, or other types of media content. Examples of audio content includes songs, albums, podcasts, audiobooks, etc. Examples of video content includes movies, music videos, television episodes, etc. Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select desired media content when the user does not know any identifying information for the media content.

SUMMARY

In general terms, this disclosure is directed to media identification and playback. In one possible configuration and by non-limiting example, a media-playback device generates a user interface that is specifically configured to identify audio content and automatically play back a media item corresponding to the audio content along with a related media playlist. Various aspects are described in this disclosure, which include, but are not limited to, the following aspects.

In one aspect, a media playback device comprises: a sound-sensing device configured to record audio content played by an external audio source; a content output device; a memory device encoding instructions that, when executed by a processor, cause the media playback device to record a portion of the audio content from the external audio source, identify the audio content, receive a media item corresponding to the audio content, and automatically initiate playback of the media item on the content output device before playback of the audio content by the external source has concluded.

In another aspect, a method of identifying audio content comprises: recording audio content from an external audio source; analyzing the audio content to identify an acoustic fingerprint; comparing the acoustic fingerprint of the audio content with a database of acoustic fingerprints; identifying a media item matching the audio content acoustic fingerprint; and automatically playing the media item.

In yet another aspect, a system for identifying and playing audio content comprises: an audio analysis server application configured to analyze audio content received from a mobile device, identify an acoustic fingerprint of the audio content, compare the acoustic fingerprint to an acoustic fingerprint database, and identify a media item having the same acoustic fingerprint as the audio content; and a media server application configured to access the media item from a media content database, determine additional media content to include in a related media playlist, and communicate the related media playlist to the mobile device.

In another aspect, one or more computer-readable media have computer-executable instructions embodied thereon that, when executed by one or more computing devices, cause the computing devices to: record audio content from an external audio source; analyze the audio content to identify an acoustic fingerprint; compare the acoustic fingerprint of the audio content with a database of acoustic fingerprints; identify a media item matching the audio content acoustic fingerprint; and automatically play the media item.

DETAILED DESCRIPTION

Figure 1:
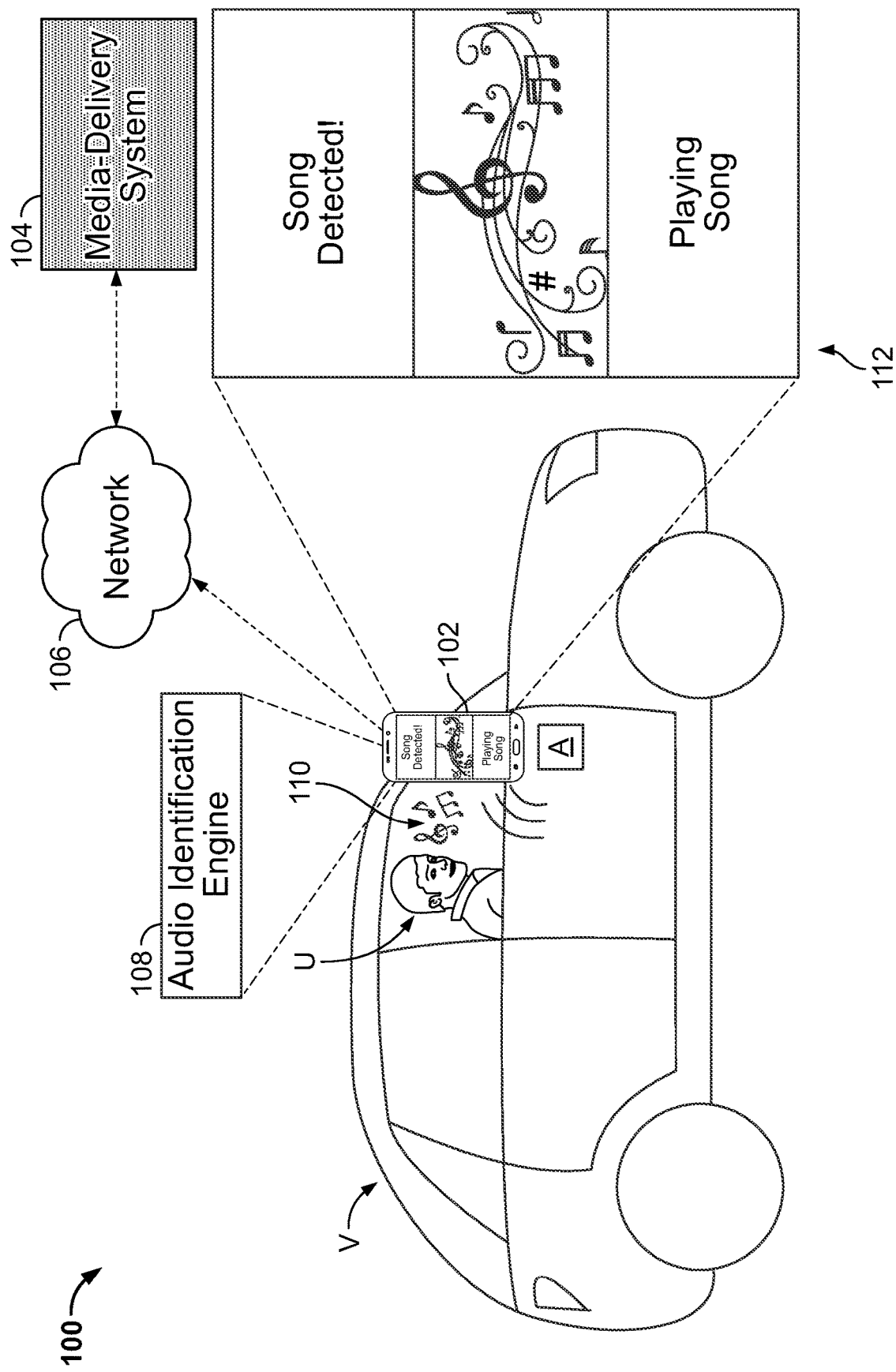
FIG. 1 illustrates an example media-playback system for media identification and playback.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content during various activities, including travelling. As used herein, the term "travel" and variants thereof refers to any activity in which a user is in transit between two locations. For example, a user is in transit when being conveyed by a vehicle, including motorized and non-motorized, public transit and private vehicles. A user is also in transit when moving between locations by other means such as walking and running.

Enjoying media content while travelling presents many challenges. First, it can be difficult to safely interact with a media-playback device while traveling in a manner that does not interfere with travel related activities (driving, navigating, etc.) Second, desired media content may not be available or accessible in a format that can be accessed while travelling. Third, accessing media content while travelling may be difficult, expensive, or impossible depending on network availability/capacity along the route of travel. Fourth, accessing and playing back media content can require significant amounts of energy, potentially draining a battery in the media-playback device. Fifth, it can be challenging to connect a media-playback device to a vehicle-embedded audio system for playback while travelling in a vehicle. Embodiments disclosed herein address some or all of these challenges. It should be understood, however, that aspects described herein are not limited to use during travel.

For example, in some embodiments, the media-playback device includes a limited-attention interface that requires less attention from the user and/or is less distracting than a standard interface. This limited-attention interface can be useful during travelling because a user may have limited attention available for interacting with a media-playback device due to the need to concentrate on travel related activities, including for example driving and navigating. But the limited-attention interface can also be configured for use playing back media content during other activities that require the user's concentration, such as exercising, playing games, operating heavy equipment, reading, studying, etc.

Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, travelling (and in particular driving) is described as one example of an activity during which media content is consumed. However, it should be understood that the same concepts are similarly applicable to other forms of media consumption and to other activities, and at least some embodiments include other forms of media consumption and/or are configured for use during other activities.

FIG. 1 illustrates an example system 100 for media identification and playback. The example system 100 includes a media-playback device 102 and a media-delivery system 104. The media-playback device 102 includes an audio identification engine 108 and a user interface 112. The system 100 communicates across a network 106. Also shown, is a user U traveling in a vehicle V who is hearing an external audio source A.

The media-playback device 102 plays back media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user during travel or other activities. The media content that is played back may be selected based on user input or may be selected without user input. The media content may be selected for playback without user input by either the media-playback device 102 or the media-delivery system 104. For example, media content can be selected for playback without user input based on stored user profile information, location, travel conditions, current events, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 1, the media-playback device 102 can also be integrated with the vehicle (e.g., as part of a dash-mounted vehicle infotainment system).

A user interface 112 is generated for selecting and playing back media content items. In at least some embodiments, the user interface 112 allows a user U to prompt the audio identification engine 108 to identify audio content from an external audio source A. In some embodiments, the external audio source A is a vehicle media-playback system. In other embodiments, the external audio source can be a radio, a CD player, a juke box, or other audio producing devices. The audio identification engine 108 then functions to record the audio content, analyze the audio content, and communicate with the media delivery system 104 to retrieve a media item corresponding to the audio content. The media item is presented on the user interface 112 and is automatically played on the media-playback device 102 as media output 110.

Figure 2:
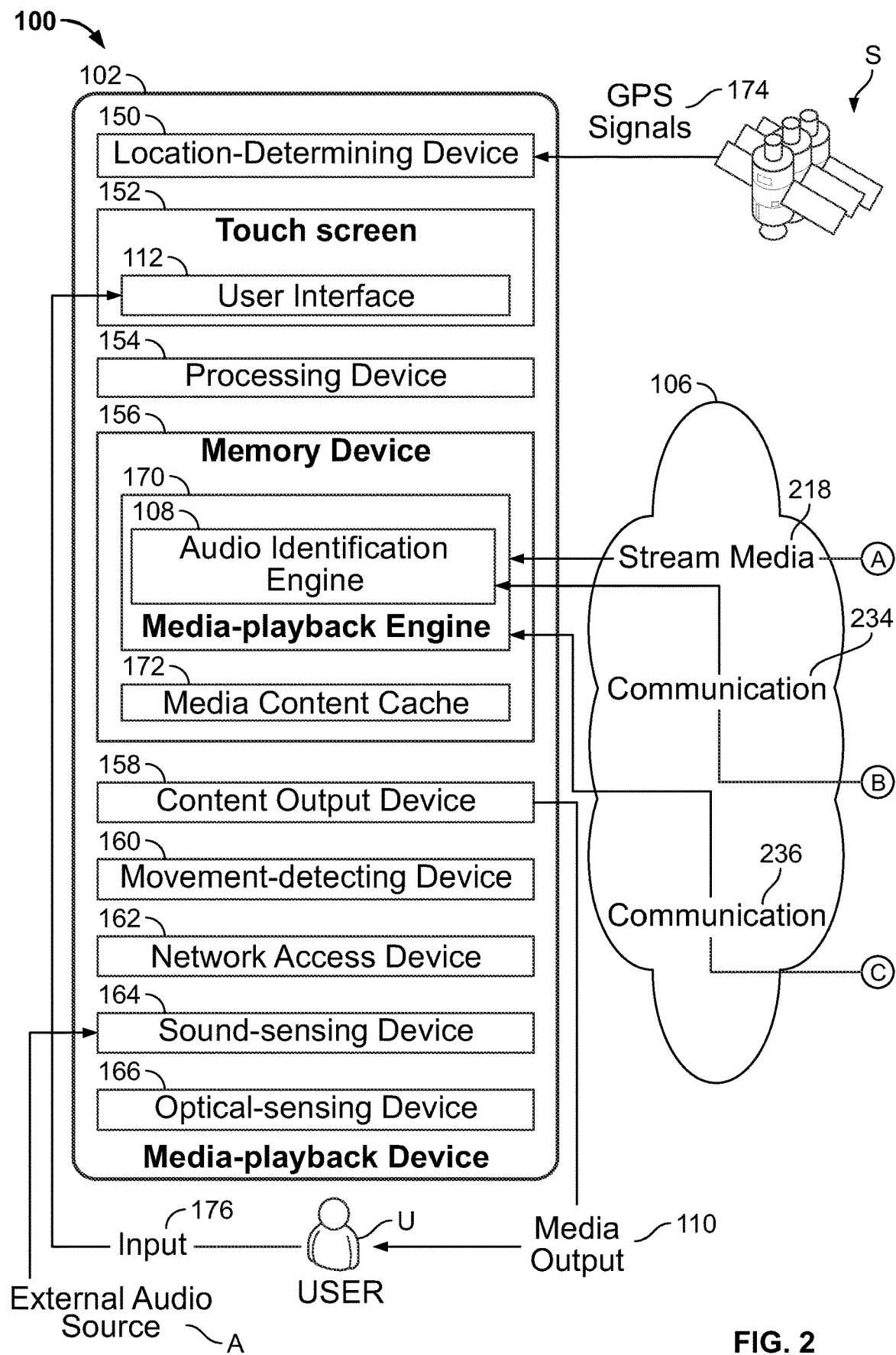
FIG. 2 is a schematic illustration of the example media-playback system of FIG. 1.
Figure 2:
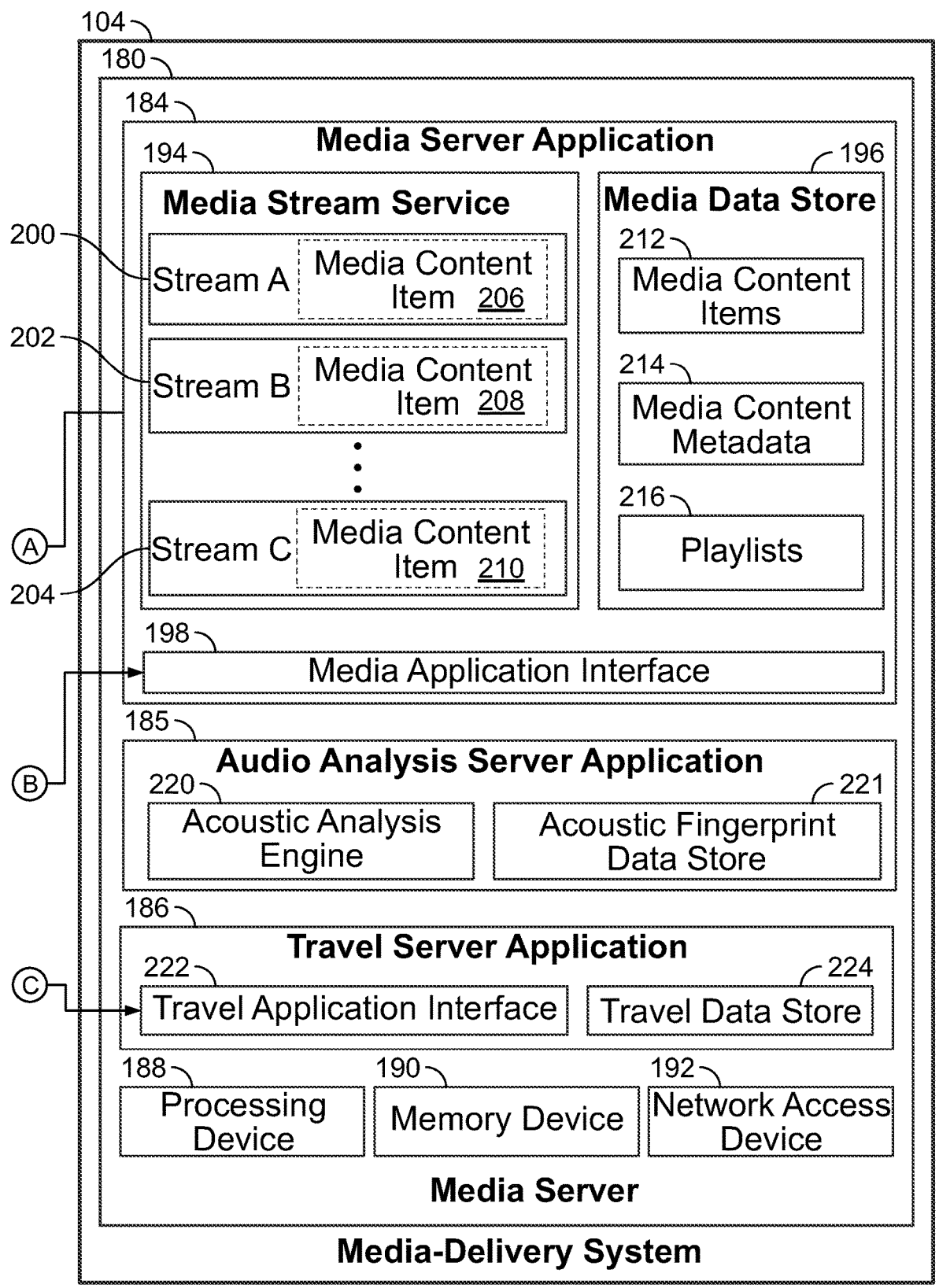

FIG. 2 is a schematic illustration of the example media-playback system 100 of FIG. 1. In FIG. 2, the media-playback device 102, the media-delivery system 104, and the network 106 are shown. Also shown are the user U, the external audio source A, and satellites S.

As noted above, the media-playback device 102 plays media content items. In some embodiments, the media-playback device 102 plays media content items that are provided (e.g., streamed, transmitted, etc.) by a system external to the media-playback device such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, Blu-Ray™ or DVD player, media player, stereo, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the movement-detecting device 160, and the optical-sensing device 166.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 112 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits. The processing device 154 executes instructions store in the memory device 156.

The memory device 156 operates to store data and instructions. In some embodiments, the memory device 156 encodes instructions for a media-playback engine 170 that includes the audio identification engine 108. In some embodiments, the media-playback engine 170 selects and plays back media content and generates interfaces for selecting and playing back media content items. In some embodiments, the media-playback engine 170 works with the audio identification engine 108 to select and play media content items. As described above, the audio identification engine 108 identifies audio content from external sources and initiates playback of media content items through the media-playback engine that match and are related to the audio content.

In at least some embodiments, the audio identification engine 108 records and analyzes audio content from external sources. The audio identification engine 108 then accesses a matching media content item from the media-delivery system 104 and immediately initiates playback of the media content item through the media-playback engine 170. No additional interaction from the user U is required to play the media content item. Additionally, the audio identification engine 108 may access additional media content from the media-delivery system 104 which is then played by the media-playback engine 170.

Some embodiments of the memory device also include a media content cache 172. The media content cache 172 stores media-content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media-content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback).

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. In some embodiments, the media output 110 is directed into an interior cabin of the vehicle V. Examples of the content output device 158 include a speaker assembly comprising one or more speakers, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones, speaker system, or vehicle head unit.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret the acceleration as indicating movement of the media-playback device 102 too.

The network access device 162 operates to communicate with other computing devices over one or more networks, such as the network 106. Examples of the network access device 162 include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., ambient sounds within the environment in which the media-playback device 102 is located). In some embodiments, the sound-sensing device 164 comprises one or more microphones. For example, the sound-sensing device 164 may capture a recording of audio content from an external audio source A proximate the media-playback device 102. These recordings may be analyzed by the audio identification engine 108 to determine the identity of the audio content and retrieve matching media content from the media-delivery system 104.

These recordings may also be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words. Additionally or alternatively, the sound-sensing device may determine various sound properties about the sounds proximate the user such as volume, dominant frequency or frequencies, etc. These sound properties may be used to make inferences about the environment proximate to the media-playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, an audio analysis server application 185, a travel server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the audio identification engine 108.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. In some embodiments, the media content metadata 214 indicates whether a particular user likes a particular media content item 212 or whether that media content item 212 is similar to other media content items 212 that a particular user likes or dislikes. The playlists 216 operate to identify one or more of the media content items 212 and assemble them into a programmed list. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The audio analysis server application 185 operates to compare an acoustic fingerprint for audio content received from the audio identification engine 108 with an acoustic fingerprint data store 221. In some embodiments, the audio identification engine 108 analyzes the audio content to generate an acoustic fingerprint which is then communicated to the acoustic analysis engine 220. In other embodiments, the audio identification engine 108 communicates the recording of the audio content to the acoustic analysis engine 220 which then generates the acoustic fingerprint. The acoustic fingerprint is then compared to the acoustic fingerprint data store 221 to find a match.

Upon finding a matching media content item, the acoustic analysis engine 220 communicates identifying information, such as media content metadata 214, along with the media content item to the audio identification engine 108. The identifying information can be displayed on a visual display of the user interface 112 of the media-playback device 102 and/or be announced verbally through the content output device 158.

Additionally, the acoustic analysis engine 220 communicates with the media server application 184 to generate a playlist of related media content items 212 and communicate the playlist to the media-playback engine 170. In some embodiments, the playlist includes media content items 212 selected to match listening preferences of the user. Such preferences may be based on past listening behavior and playlists made by the user. Alternatively, one of the existing playlists 216 related to the media content item may be communicated to the media-playback engine 170 for playback on the media-playback device 102. In some embodiments, the media item and playlist of additional media content are songs and the playlists are related to the media item by one or more of genre, artist, album, level of popularity, and mood.

The travel server application 186 provides travel-specific functionality for providing media content items and interfaces for accessing media content items to media-playback devices. In some embodiments, the travel server application 186 includes a travel application interface 222 and a travel data store 224.

The travel application interface 222 can receive requests or other communication from media-playback devices or other systems, to retrieve travel information and media content items for playback during travel. For example, in FIG. 2, the travel application interface 222 receives communication 236 from the media-playback engine 170.

Additionally, the travel server application 186 can process data and user input information received from the media-playback device 102. In some embodiments, travel server application 186 operates to transmit information about the suitability of one or more media content items for playback during travel. In some embodiments, the travel server application 186 may provide a list of media content items that are suited to particular geographic locations, travel conditions, modes of travel, user preferences, etc.

For example, the travel server application 186 may store metadata and other information that associates media content items with geographic locations, forms of travel, travel conditions, etc. in the travel data store 224. The travel server application 186 may also store information that associates media content items with an individual or group of users' preferences for consuming that media content during travel in the travel data store 224. The travel data store 224 may comprise one or more files or databases. The travel data store 224 can also comprise files, tables, or fields in the media data store 196.

In some embodiments, the travel data store 224 stores travel media metadata. The travel media metadata may include various types of information associated with media content items, such as the media content items 212 in the media data store 196. In some embodiments, the travel data store 224 provides information that may be useful for selecting media content items for playback during travel. For example, in some embodiments, the travel data store 224 stores travel scores for media content items that correspond to the suitability of particular media content items for playback during travel. As another example, in some embodiments, the travel data store 224 stores timestamps (e.g., start and end points) that identify portions of media content items that are particularly well-suited for playback during travel (or other activities).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media playback during travel, other embodiments are possible as well. For example, in some embodiments, the media-playback device 102 includes a media data store 196 and the media-playback device 102 is configured to select and playback media content items without accessing the media-delivery system 104. Further, in some embodiments, the media-playback device 102 operates to store previously streamed media content items in a local media data store (e.g., the media content cache 172).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 112 to issue requests, for example, to playback media content for playback during travel on the media-playback device 102.

Figure 3A:
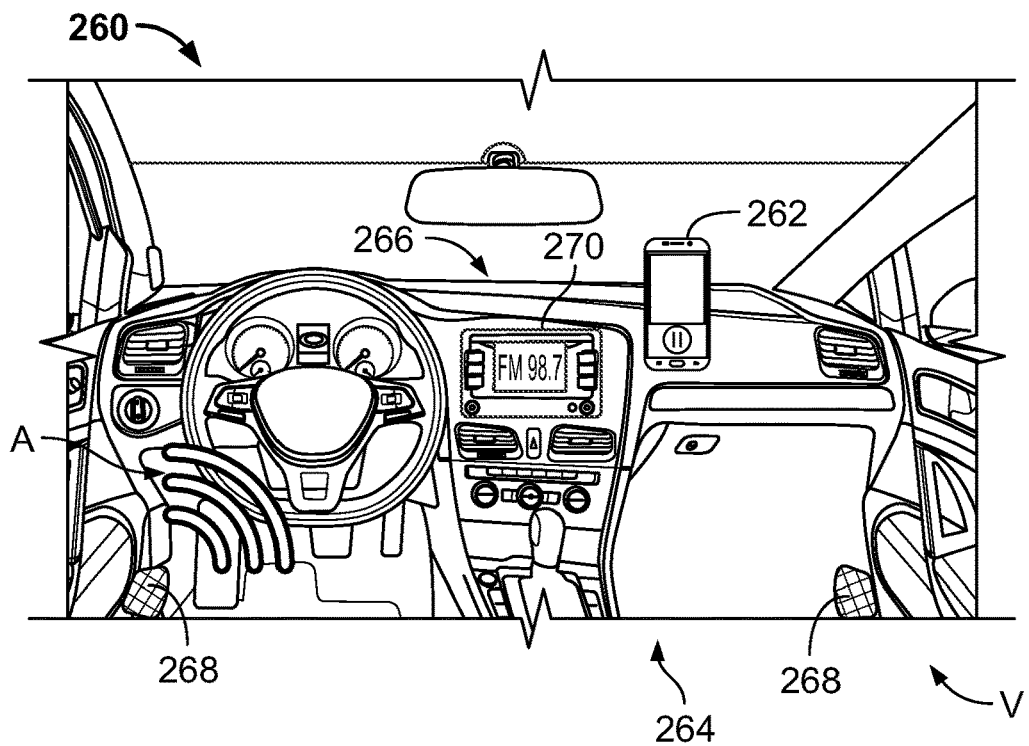
FIG. 3A is a schematic diagram of an embodiment of the media-playback system of FIG. 1.

FIG. 3A is a schematic diagram of an embodiment of a media-playback system 260 shown within an interior cabin of the vehicle V. The media-playback system 260 is an example of the media-playback system 100.

In this example, the media-playback system 260 includes a media-playback device 262. The media-playback device 262 is an embodiment of the media-playback device 102. Although not shown in this figure, some embodiments of the media-playback system 260 also include a media-delivery system such as the media-delivery system 104.

Also shown in this figure, is a vehicle media-playback system 264. The vehicle media-playback system 264 can provide an external audio source A. An example of the vehicle media-playback system 264 is illustrated and described with respect to FIG. 4.

As shown in FIG. 3A, the vehicle media-playback system 264 includes a vehicle head unit 266 and a speaker assembly 268. The vehicle head unit 266 receives or generates media content signals from one or more sources. As shown in FIG. 2, the vehicle head unit 266 includes a display device 270, which can be used to display information about the selected or available sources of media content. In some embodiments, the display device 270 can also display media content. Typically, the vehicle head unit 266 also includes a user input assembly 360 that is usable to control the vehicle media-playback system 264 and to select a source of media content. The vehicle head unit 266 then transmits those signals to output devices such as the speaker assembly 268 (sometimes via an amplifier). In some embodiments, the vehicle head unit 266 also generates image or video content signals that can be transmitted to the display device 270 or another device for display.

In FIG. 3A, the vehicle media playback system 264 is operating as an external audio source A while the FM radio is operating. As is illustrated in more detail in FIG. 9, the media-playback device 262 can be prompted to record external audio content in order to identify the audio content. Once the audio content is identified, media output 110 corresponding to the audio content is played from the media-playback device 262 as shown in FIG. 3B.

Figure 3B:
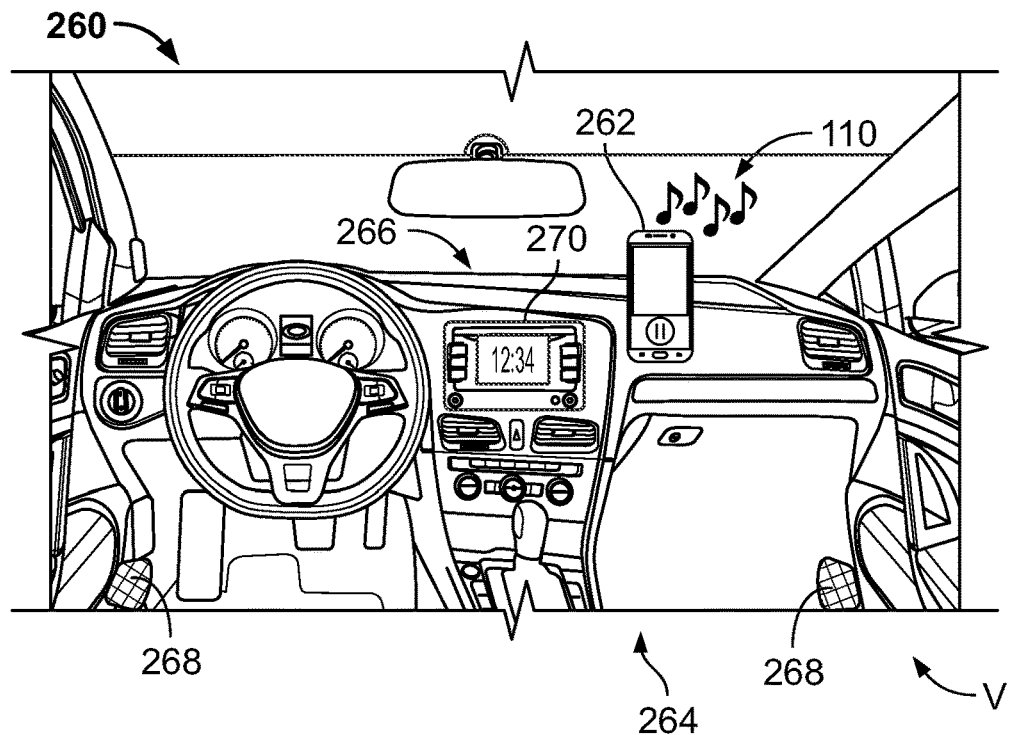
FIG. 3B is a schematic diagram of another embodiment of the media-playback system of FIG. 1.

FIG. 3B shows media-playback system 260 after audio content has been identified and is being played back by the media-playback device 262. The vehicle media-playback system 264 has been turned off and media output 110 is coming from the media-playback device 262 instead.

Figure 3C:
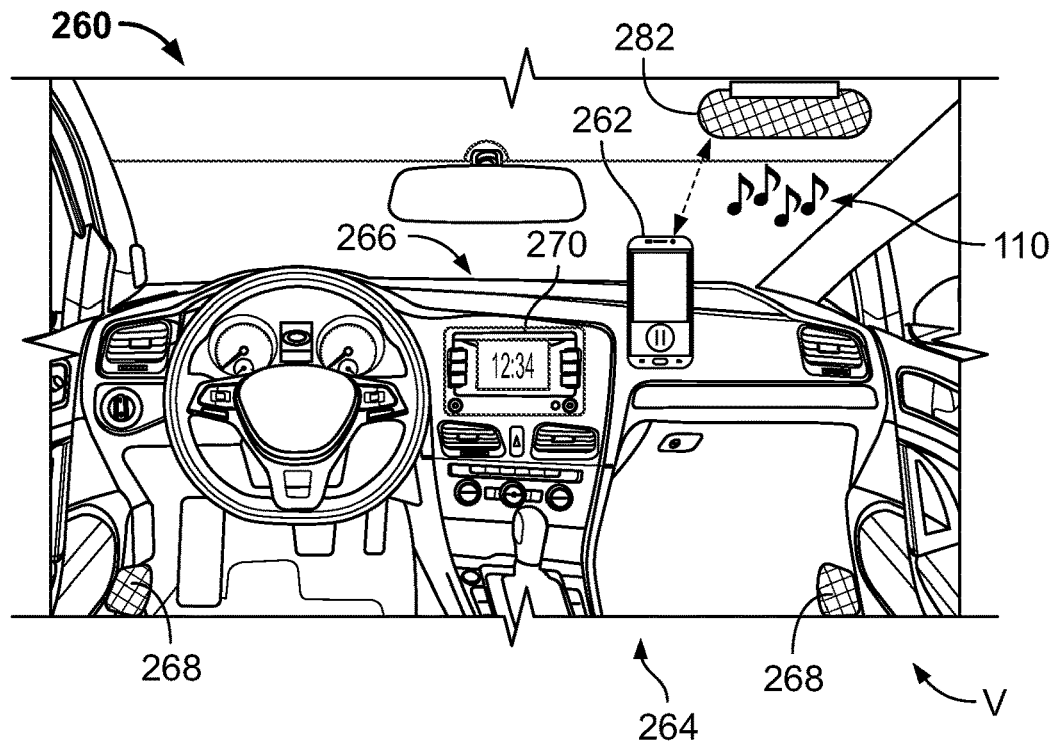
FIG. 3C is a schematic diagram of another embodiment of the media-playback system of FIG. 1.

In an alternative embodiment of the media-playback system 260 shown in FIG. 3C, the media-playback device 262 is operating in conjunction with an external speaker assembly 282. The external speaker assembly 282 generates media output 110 based on a signal received from the media-playback device 262 to play the identified media content. The external speaker assembly 282 can include one or more speakers. The external speaker assembly 282 can also include a mechanical apparatus for attachment to the vehicle. Although alternatives are possible, in FIG. 3C, the external speaker assembly 282 is attached to a sun visor of the vehicle.

In some embodiments, the media-playback device 262 connects to the external speaker assembly 282 using BLUETOOTH®. The media-playback device 262 then transmits an audio signal to the external speaker assembly 282 via Bluetooth, which is then used by the external speaker assembly 282 to generate the media output 110. In some embodiments, the media-playback device 262 and the external speaker assembly 282 communicate using a different wireless protocol. Further, in some embodiments, the media-playback device 262 can transmit a media content signal to the external speaker assembly 282 via a cable (e.g., an analog or digital audio cable, a universal serial bus (USB) cable).

In FIG. 3C, the vehicle media-playback system 264 is not being used to generate media output. Instead, the media-playback device 262 is transmitting a signal to the external speaker assembly 282, which generates the media output 110 without using the vehicle media-playback system 264.

Figure 3D:
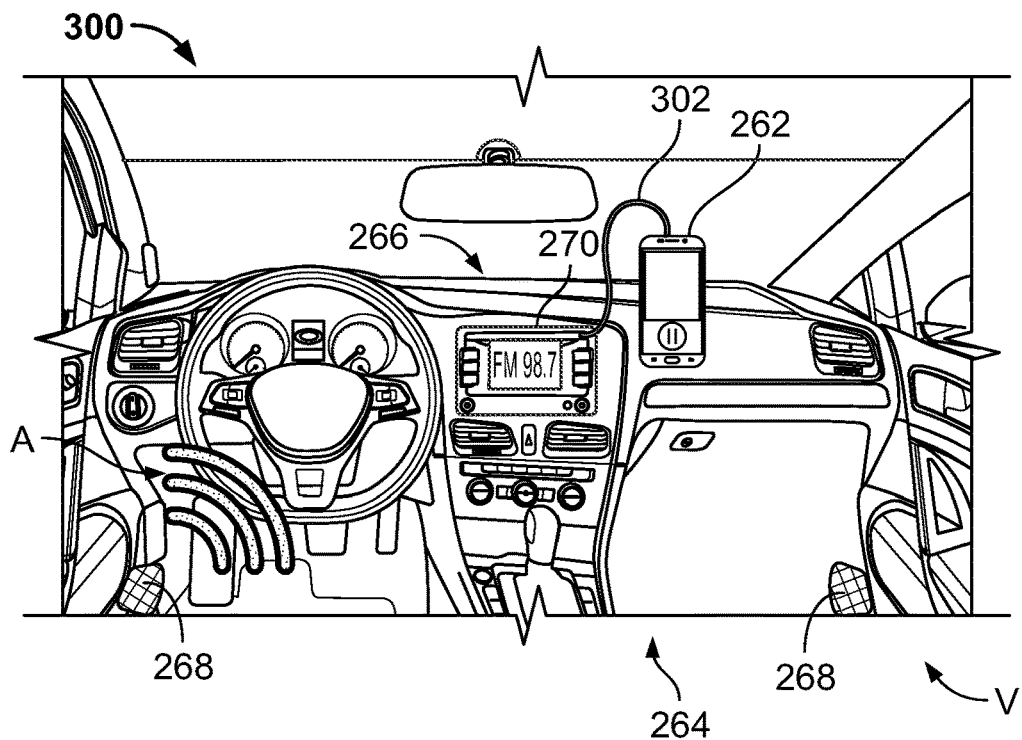
FIG. 3D is a schematic diagram of another embodiment of the media-playback system of FIG. 1.

FIG. 3D is a schematic diagram of an embodiment of a media-playback system 300. The media-playback system 300 is an example of the media-playback system 100. The media-playback system 300 includes the media-playback device 262, the vehicle media-playback system 264, and a cable 302.

The cable 302 connects the media-playback device 262 to the vehicle media-playback system 264. Although alternatives are possible, the cable 302 can be an analog audio cable that is connects an audio output device of the media-playback device 262 (e.g., a headphone jack) to a wired input device 354 of the vehicle media-playback system 264 (e.g., an auxiliary input jack). In alternative embodiments, the cable 302 is a USB cable that connects the media-playback device 262 to the vehicle media-playback system 264.

As shown in FIG. 3D, the display device 270 indicates that the vehicle media-playback system 264 is generating external audio content A received from an FM radio transmission. The external audio A is played within the interior cabin of the vehicle by the vehicle media-playback system 264 using the speaker assembly 268.

Figure 3E:
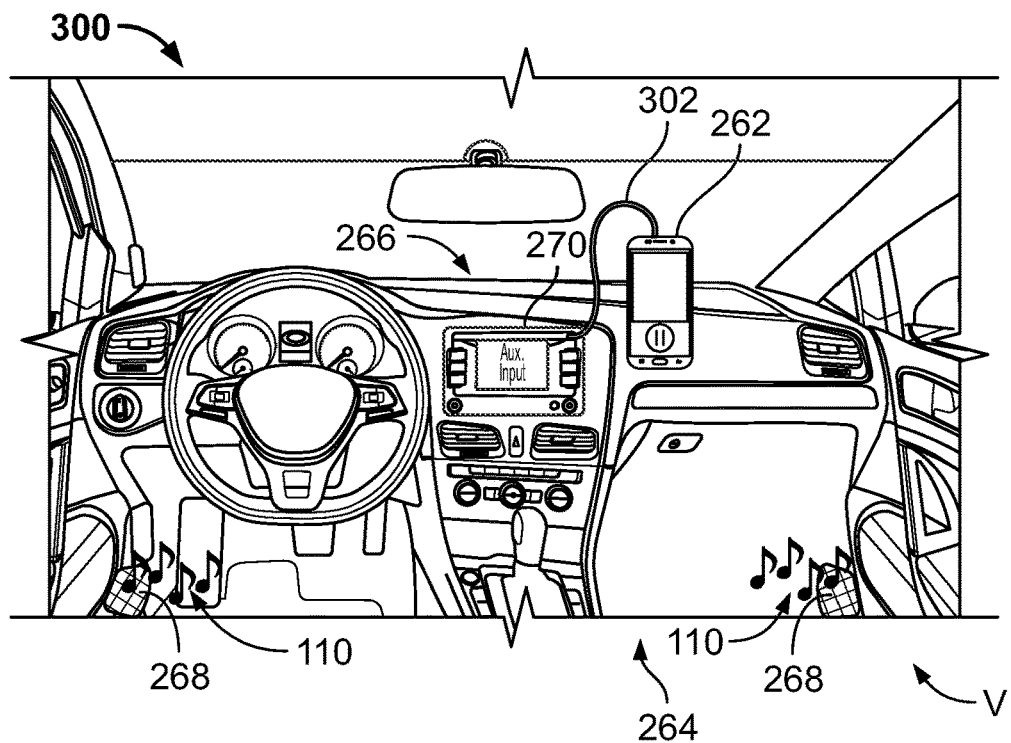
FIG. 3E is a schematic diagram of another embodiment of the media-playback system of FIG. 1.

In FIG. 3E, the vehicle media-playback system 264 input has switched to auxiliary input from the media-playback device 262. In the process described with respect to FIGS. 6-11, the media-playback device 262 has recorded and identified the audio content produced by the vehicle media-playback system 264 as external audio A. Now the media-playback device 262 has been selected as the input for the vehicle media-playback system 264. The selection of auxiliary input may be done manually by a user by using a user interface or one or more controls on the vehicle media-playback system 264 or by controls on the steering wheel. Alternatively, the media-playback device 262 can send a command to the vehicle media-playback system 264 to change the input from the FM radio to auxiliary input. Once the input has been changed, the media-playback device 262 plays media output 110 through the speaker assembly 268.

Figure 3F:
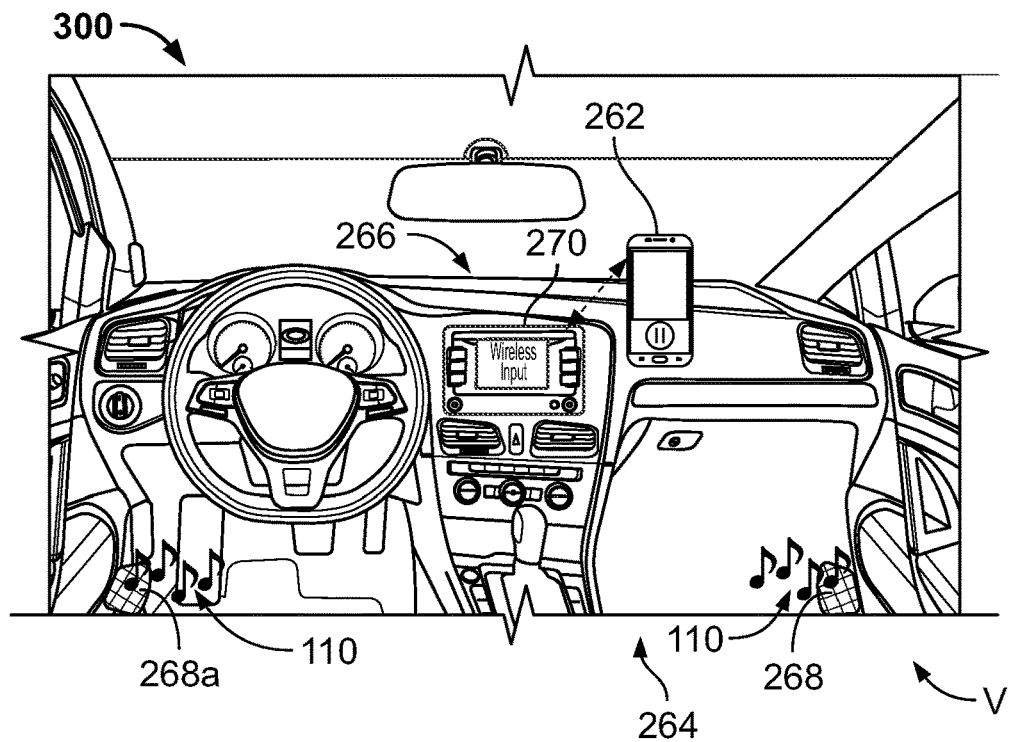
FIG. 3F is a schematic diagram of another embodiment of the media-playback system of FIG. 1.

FIG. 3F is a schematic diagram of an alternative embodiment of a media-playback system 300. In this example, the media-playback device 262 and the vehicle media-playback system 264 are connected using a wireless communication protocol. Although alternatives are possible, the media-playback device 262 and the vehicle media-playback system 264 can be connected using Bluetooth. As an alternative, the media-playback device 262 and the vehicle media-playback system 264 can be connected via a Wi-Fi network (e.g., using an 802.11 wireless communication protocols) or another type of wireless connection.

As shown in FIG. 3F, the display device 270 indicates that the vehicle media-playback system 264 has been switched to generate media output 110 based on a signal received from a wireless input instead of the FM radio. The media output 110 is played within the interior cabin of the vehicle by the vehicle media-playback system 264 using the speaker assembly 268.

Figure 4:
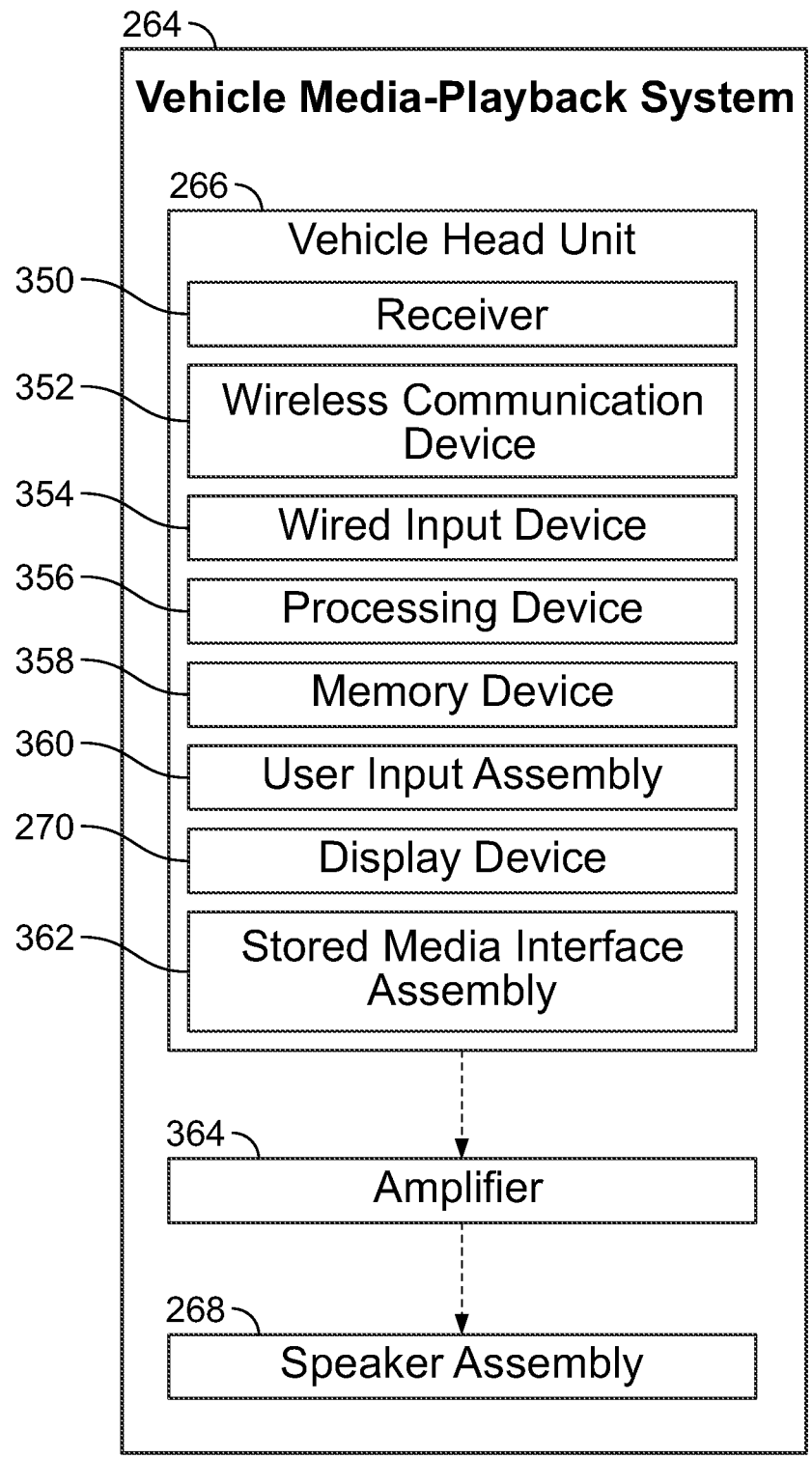
FIG. 4 is a schematic illustration of an embodiment of the vehicle media-playback system of FIG. 3A.

FIG. 4 is a schematic diagram of an embodiment of the vehicle media-playback system 264. In this example, the vehicle media-playback system 264 includes a vehicle head unit 266, an amplifier 364, and a speaker assembly 268.

The vehicle head unit 266 received user input and generates media content from various sources. In this example, the vehicle head unit 266 includes a receiver 350, a wireless communication device 352, a wired input device 354, a processing device 356, a memory device 358, a user input assembly 360, a display device 270, and a stored media interface assembly 362. The processing device 356 may be similar to the processing device 154 and the memory device 358 may be similar to the memory device 156.

The receiver 350 receives media content signals from various external sources. The received signals can then be used to generate media output by the vehicle media-playback system 264. The receiver 350 may comprise one or more tuners for receiving radio signals such as FM or AM radio signals. Additionally, the receiver 350 may comprise a receiver for receiving satellite radio signals.

The wireless communication device 352 communicates with other devices using wireless data signals. The wireless communication device 352 can include one or more of a Bluetooth transceiver and a Wi-Fi transceiver. The wireless data signal may comprise a media content signal such as an audio or video signal.

The wired input device 354 receives a cable for providing media content and/or commands. In some embodiments, the wired input device 354 can include an auxiliary input jack for receiving a plug that transmits analog audio signals. The wired input device 354 can also include different or multiple input jacks for receiving plugs that transmit other types of analog or digital signals (e.g., USB, HDMI, Composite Video, YPbPr, DVI). In some embodiments, the wired input device 354 is also used to receive instructions from other devices. For example, the wired input device 354 can receive instructions from the media-playback device 102 to change the input of the vehicle head unit 266.

The user input assembly 360 comprises one or more input devices for providing user input to the vehicle media-playback system 264. In some embodiments, the user input assembly 360 includes multiple knobs, buttons, and other types of input controls for adjusting volume, selecting sources and content, and adjusting various output parameters. In some embodiments, the various input devices are disposed on or near a front surface of the vehicle head unit 266. The various input devices can also be disposed on the steering wheel of the vehicle or elsewhere. Additionally or alternatively, the user input assembly 360 can include one or more touch sensitive surfaces, which can be incorporated in the display device 270.

The display device 270 displays information. In some embodiments, the display device 270 includes a liquid crystal display (LCD) panel for displaying textual information about content and/or settings of the vehicle media-playback system 264. The display device 270 can also include other types of display panels such as a light emitting diode (LED) panel. In some embodiments, the display device 270 can also display image or video content.

The stored media interface assembly 362 reads media content stored on a physical medium. In some embodiments, the stored media interface assembly 362 comprises one or more devices for reading media content from a physical medium such as a compact disc or cassette tape.

The amplifier 364 amplifies a signal received from the vehicle head unit 266 and transmits the amplified signal to the speaker assembly 268. In this manner, the media output 110 can be played back at a greater volume. The amplifier 364 may include a power source to power the amplification.

The speaker assembly 268 produces an audio output based on an electronic signal. The speaker assembly 268 may comprise one or more speakers disposed at various locations within the vehicle. In some embodiments, separate signals are received for at least some of the speakers (e.g., to provide stereo or surround sound). The speaker assembly 268 may be an external audio source A as well as a source of media output 110.

Figure 5A:
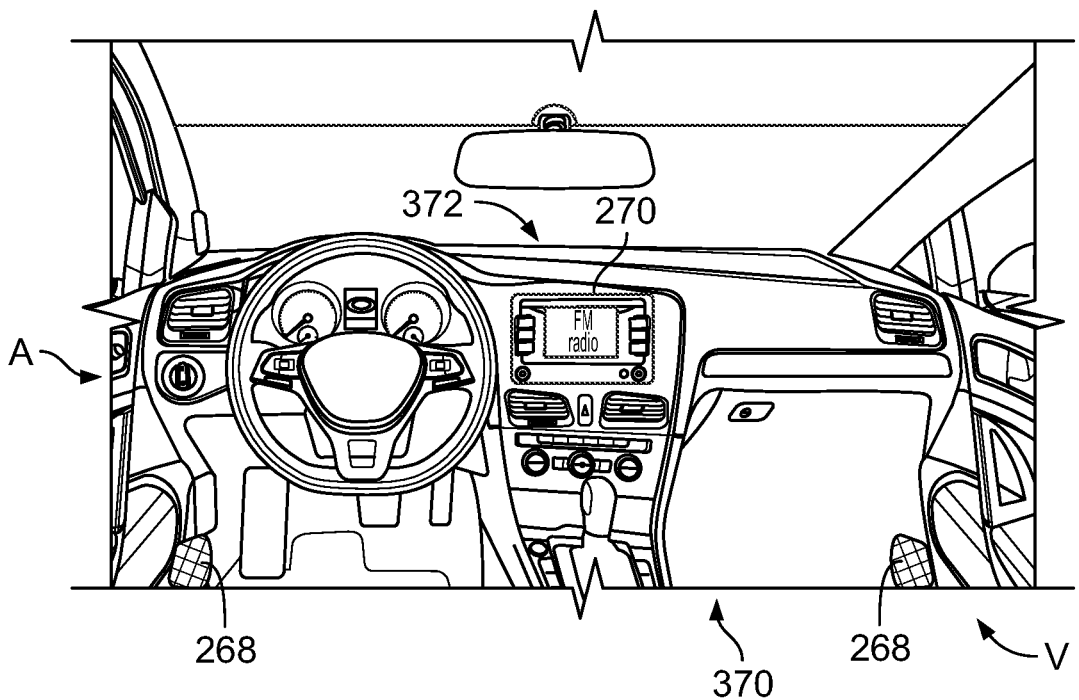
FIG. 5A is a schematic diagram of an embodiment of a vehicle media-playback system that incorporates a media-playback device.
Figure 5B:
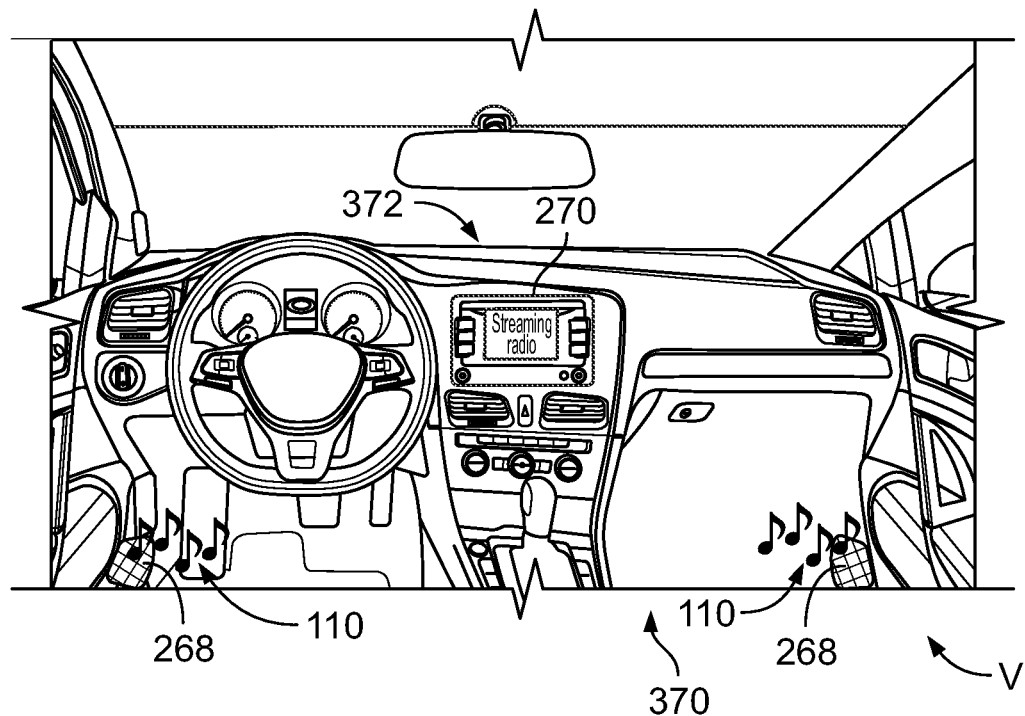
FIG. 5B is another schematic diagram of an embodiment of the vehicle media-playback system of FIG. 5B.

FIG. 5A is a schematic diagram of an embodiment of a vehicle media-playback system 370 that incorporates a media-playback device. The vehicle media-playback system 370 is an example of the media-playback system 100. The vehicle media-playback system 370 includes a vehicle head unit 372 and the speaker assembly 268. In this example, the vehicle head unit 372 incorporates the components and functionality of both a media-playback device such as the media-playback device 102 and a vehicle head unit such as the vehicle head unit 266. The display device 270 is showing a user interface screen for selecting and playing back media content. In FIG. 5A, the display device 270 shows that the vehicle media-playback system 370 is currently playing FM radio. External audio content A is played within the interior cabin of the vehicle by the vehicle media-playback system 370 using the speaker assembly 268. Although alternatives are possible, the vehicle media-playback system 370 often also includes navigation, climate control, and vehicle maintenance capabilities too.

In some embodiments, the vehicle media-playback system 370 includes a microphone or other means of recording audio content. Recorded external audio content A is analyzed and identified. Upon identification, the vehicle media-playback system 370 automatically switches the output of the vehicle head unit 372 from FM radio (or whichever output was selected at the time) to streaming audio. The vehicle head unit 372 receives media content that corresponds to the recorded external audio A and immediately plays the media content through the speaker assembly 268 as media output 110.

Figure 6:
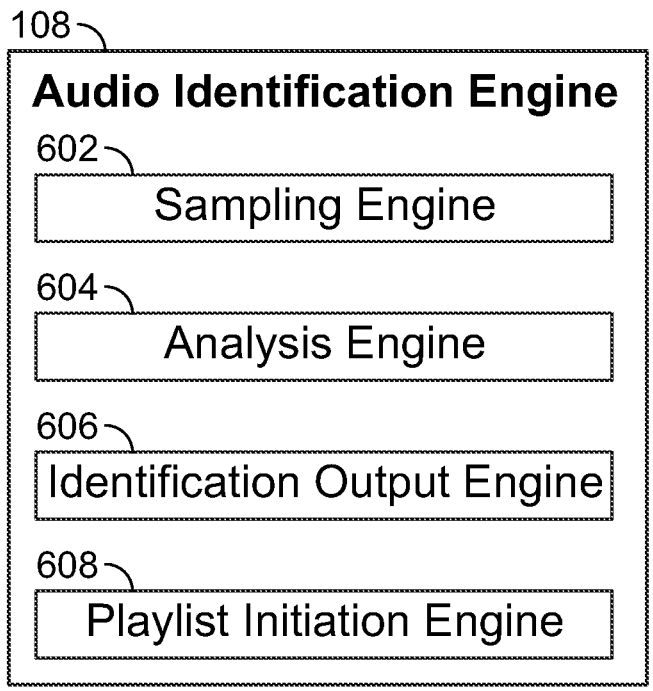
FIG. 6 is a schematic block diagram of an embodiment of the audio identification engine of FIG. 2.

FIG. 6 is a schematic block diagram of the audio identification engine 108 depicted in FIG. 2. In some embodiments, the audio identification engine 108 includes a sampling engine 602, an analysis engine 604, an identification output engine 606, and a playlist initiation engine 608.

The sampling engine 602 operates to record a portion of the audio content from an external audio source A. The recording may be occurring continuously in the background or may occur only when initiated by a user. The recording of a sample of audio content may be 10 seconds long, 20 seconds long, 30 seconds long, 60 seconds long, or 90 seconds long, for example.

The analysis engine 604 operates to analyze the recorded sample of audio content. The audio content is analyzed to determine an acoustic fingerprint, which is compared to other fingerprints in one or more databases.

The identification output engine 606 operates to retrieve identifying information regarding the audio content and present that information to the user. The identifying information may include a song title, an artist name, and an album title. The identifying information can be stored as metadata. The identifying information can be displayed and/or announced to the user.

The playlist initiation engine 608 operates to initiate playback of the identified media content and a related playlist of media content. Playing the media item can occur by playing the media item from a start of the media item, seamlessly playing the media item where the external audio source left off, or playing a distinctive portion of the media item. For example, a car radio could be halfway through a song when the user requested to identify and playback the song on his or her media playback device. The media playback device could pick up playing the song at the same point halfway through. Alternatively, the media playback device could begin playing the song at the beginning. Playback begins immediately without additional user input. The user does not need to select an option to play the media content or buy the media content to initiate playback. The user does not need to access or log in to any other media applications to initiate playback of the media content. The playlist is built based on past listening preferences and behaviors of the user.

Figure 7:
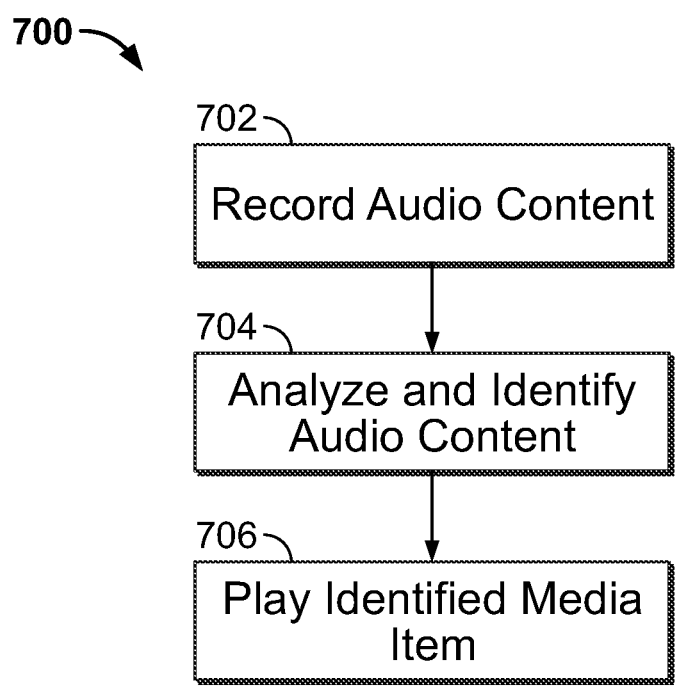
FIG. 7 illustrates an example method of identifying and playing media content that is performed by some embodiments of the media-playback system of FIG. 1.

FIG. 7 illustrates an example method 700 of identifying and playing media content performed by some embodiments of the audio identification engine 108. Such a method can be used, for example, when the user is traveling in a vehicle and listening to audio content from a vehicle media-playback system, such as the vehicle media-playback system 264 of FIG. 4. In other embodiments, the user may be listening to audio content from other external audio sources such as a juke box at a bar, a sound system at a shopping center, satellite radio at a restaurant, or a television set in the user's home.

At operation 702, audio content is recorded. The audio content is external to a media-playback device 102, such as the device depicted in FIG. 2. The audio content may be any content that a user wishes to identify. In some embodiments the audio content is music. In some embodiments the audio content comes from a vehicle speaker assembly 268.

At operation 704, the audio content is analyzed and identified. A media-playback device 102 may communicate with a media-delivery system 104 to analyze the audio content. The audio content is compared to media content stored in databases and a matching media content item is identified. At operation 706, the identified media item is played. In some embodiments, the media item is streamed on the media-playback device 102 using the media server application 184. The media item is automatically played on the media-playback device 102 without additional interaction from the user. In some embodiments, the media-playback device 102 may be linked with a vehicle media-playback system 264 that plays the media item through a speaker assembly 268.

Figure 8A:
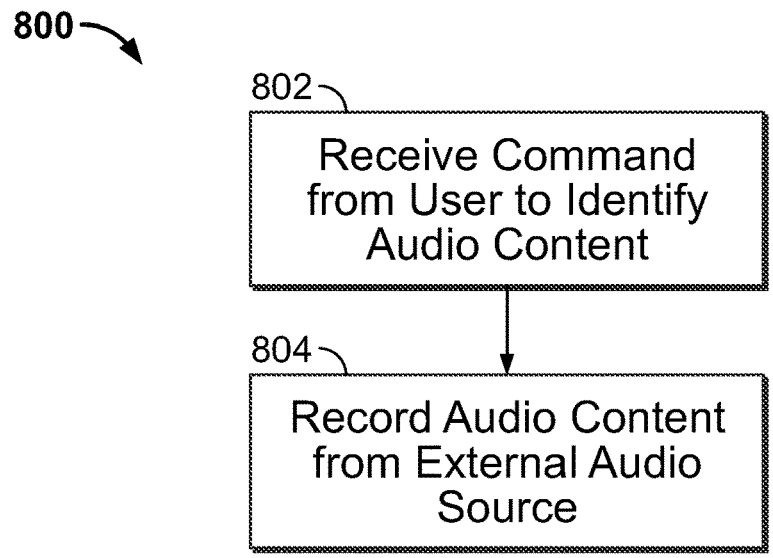
FIG. 8A illustrates an example method of recording audio content that is performed by some embodiments of the audio identification engine of FIG. 2.

FIG. 8A illustrates an example method 800 of recording audio content that is performed by some embodiments of the audio identification engine 108. At operation 802, a command is received from a user to identify audio content in the user's environment (e.g., vehicle). At operation 804, the audio content is recorded from an external audio source (e.g. vehicle speaker assembly 268). In some embodiments employed in a vehicle, switching the vehicle media-playback system 264 to access the media-playback device 102 will automatically initiate recording of audio content.

Figure 8B:
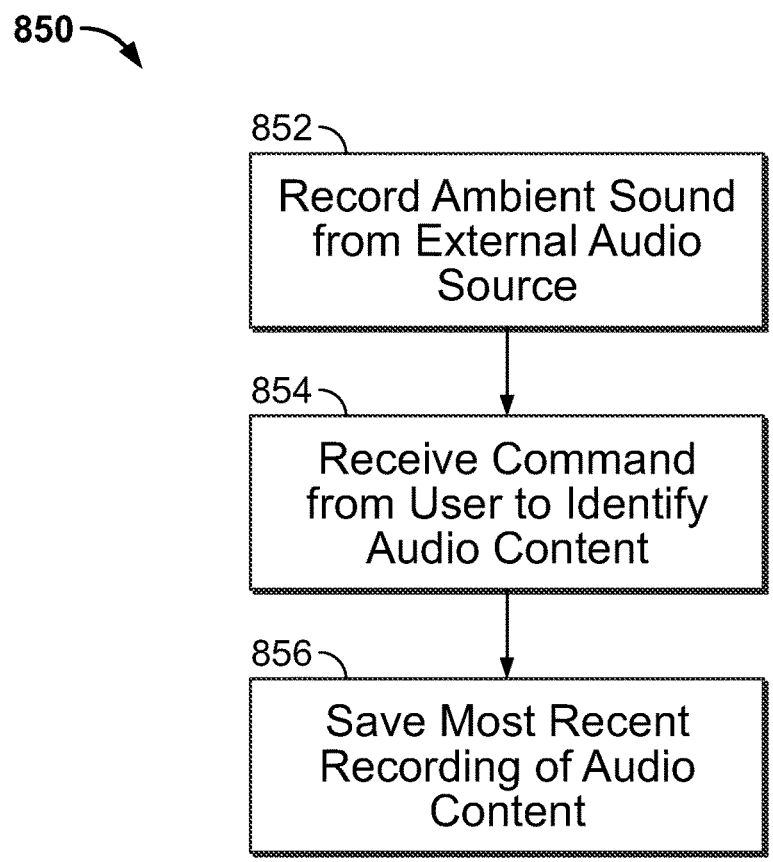
FIG. 8B illustrates an alternative example method of recording audio content that is performed by some embodiments of the audio identification engine of FIG. 2.

FIG. 8B illustrates an alternative method 850 of recording audio content that is performed by some embodiments of the audio identification engine 108. At operation 852, ambient sound from an external audio source is recorded. This recording may be happening as a background operation on the media-playback device 102. In some embodiments, the media-playback device 102 records audio continuously but only saves the last 10, 20, 30, 60, or 90 seconds of the audio recording. In such instances, the audio recording is only saved upon receiving a command from the user to identify the audio content and all other recorded audio is discarded. In such embodiments, the media-playback engine 170 pauses any audio playback while recording is taking place.

At operation 854, a command is received from a user to identify audio content is the user's environment. In some embodiments employed in a vehicle where the media-playback device 102 is integrated into the vehicle, switching the vehicle media-playback system 264 to access the media-playback device 102 will automatically initiate identification of pre-recorded audio content. In other embodiments, a touch or voice command initiates identification of the pre-recorded audio content. At operation 856, the most recently recorded sample of audio is saved for analysis.

Figure 9:
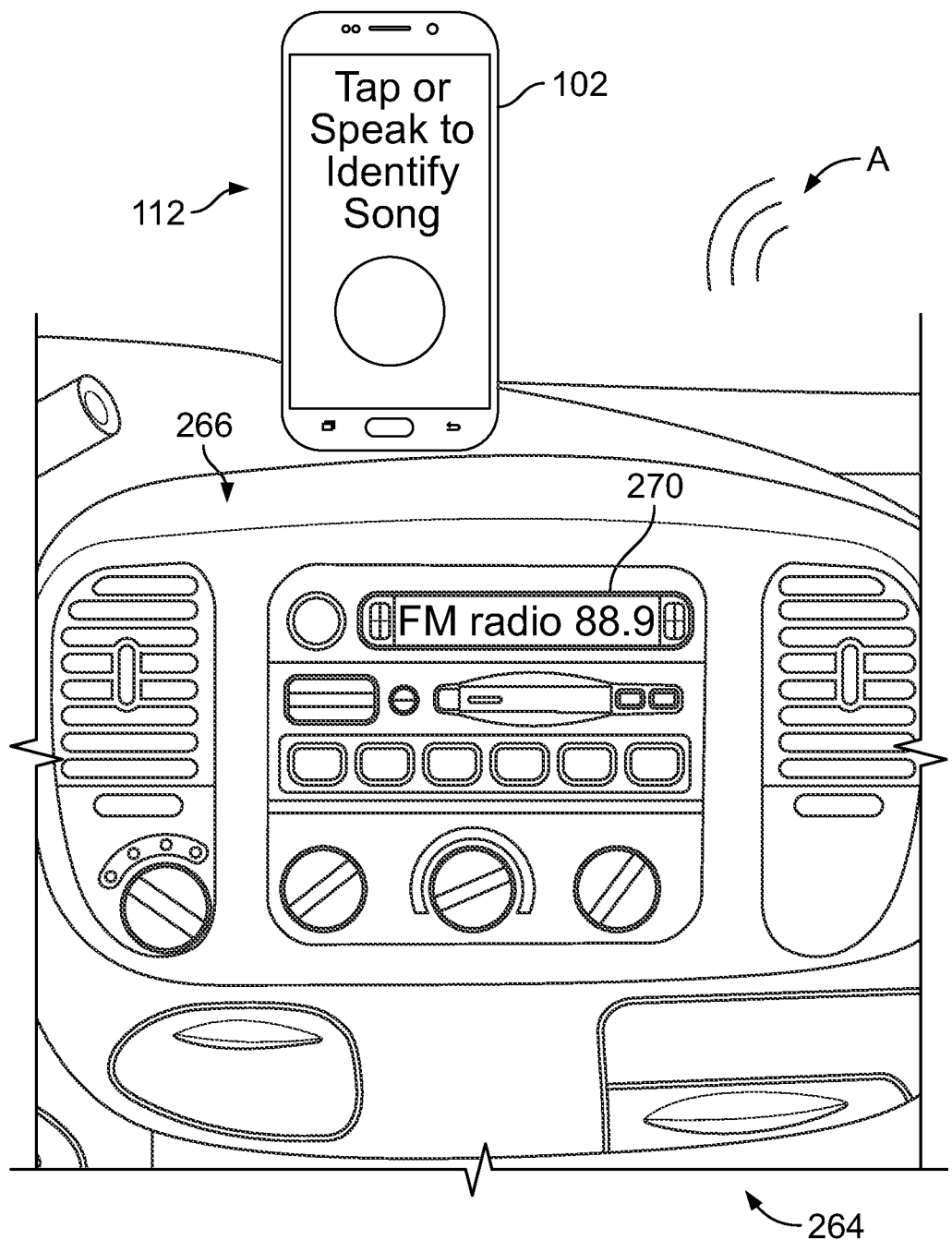
FIG. 9 illustrates an embodiment of the media-playback device of FIG. 1 operating in a vehicle.

FIG. 9 shows an embodiment of a media-playback device 102 operating within an interior cabin of the vehicle V. The display 270 of the vehicle head unit 266 indicates that the vehicle media-playback system 264 is playing audio from FM radio. The user interface 112 of the media-playback device 102 shows a screen reading "tap or speak to identify song." A user may interact with a touch screen or give verbal instruction to command the media-playback device 102 to identify external audio content A being played by the vehicle head unit 266. The exemplary method described in FIGS. 8A-B is initiated upon interaction of the user with this user interface 112.

Figure 10:
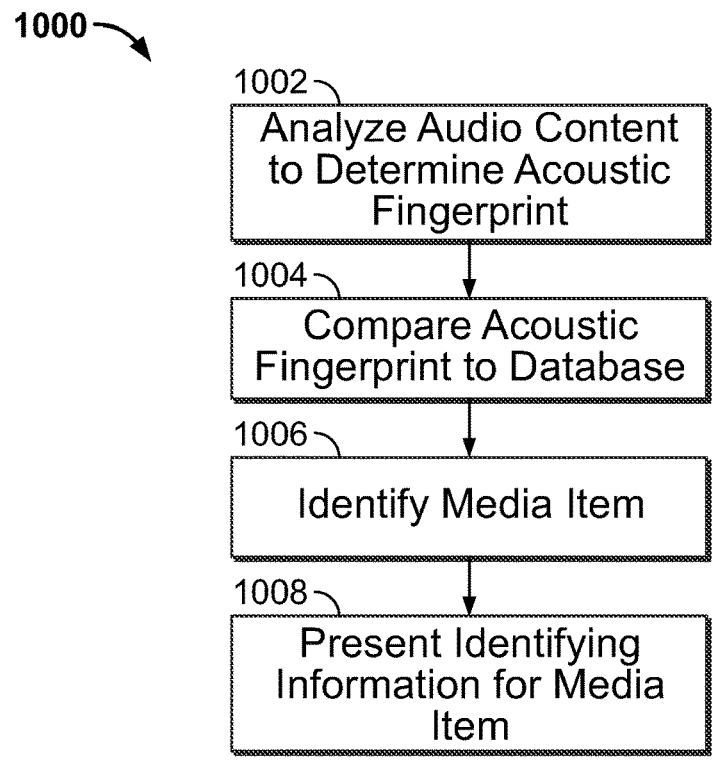
FIG. 10 illustrates an example method of analyzing and identifying audio content that is performed by some embodiments of the audio identification engine of FIG. 2.

FIG. 10 illustrates an example method 1000 of analyzing and identifying audio content that is performed by some embodiments of the audio identification engine 108. In some embodiments the method 1000 is performed in conjunction with the audio analysis server application 185.

At operation 1002 the recorded external audio content is analyzed to determine an acoustic fingerprint. The audio content is condensed down to a smaller, coded data file. There are multiple techniques which could be used to generate an acoustic fingerprint, such as identifying specific points in a spectrogram.

In some embodiments, the audio content is analyzed to determine an acoustic fingerprint which is compared to a database of acoustic fingerprints to identify a matching media content item. Acoustic fingerprints are condensed digital summaries that represent a whole media file. Acoustic fingerprints can be based upon spectrograms of audio content. A spectrogram is a time-frequency graph that typically charts frequency of the audio over time. The spectrogram can also indicate the amplitude of the frequency at a particular time by showing greater intensity at certain points. These points of greater intensity are selected to be the acoustic fingerprint.

At operation 1004, the acoustic fingerprint of the recorded audio content is compared to other acoustic fingerprints. In some embodiments, the acoustic analysis engine 220 within the audio analysis server application 185 compares the acoustic fingerprint with those stored in the acoustic fingerprint data store 221.

At operation 1006, a media item corresponding to the recorded audio content is identified. The media item and its accompanying metadata are retrieved from the media data store 196.

At operation 1008, the identifying information for the media item is displayed to the user. The identifying information may be metadata stored in the media content metadata 214 storage of the media data store 196. In embodiments where the audio content is music, the identifying information can be one or more of a song title, an artist, an album, and a genre. The identifying information can be displayed on a touch screen 152 of the media-playback device or may be announced to the user through spoken words emitted from the content output device 158.

Figure 11:
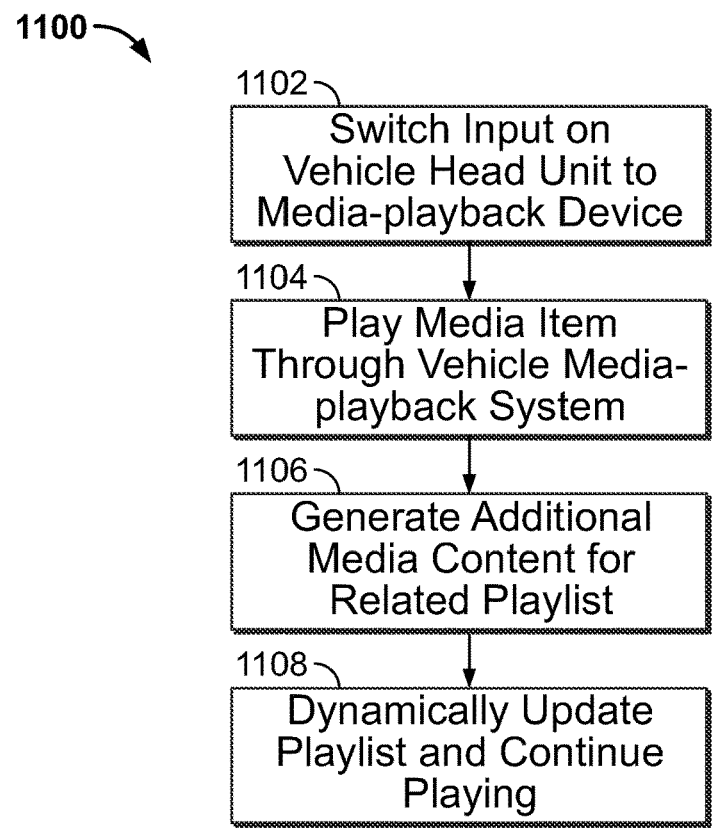
FIG. 11 illustrates an example method of playing media content that is performed by some embodiments of the audio identification engine of FIG. 2.

FIG. 11 illustrates an example method 1100 of playing identified media content that is performed by some embodiments of the audio identification engine 108 in a vehicle. The media item corresponding to the recorded audio content is automatically played through the content output device 158 of the media-playback device 102. In some embodiments, the media-playback device 102 is connected to a vehicle media-playback system 264 which plays back the media through a speaker assembly 268. The identified media content is immediately played without any additional interaction required from the user.

At operation 1102, the input of the vehicle head unit 266 is switched to receive signals from the media-playback device 102. The media-playback device 102 may communicate with the vehicle head unit 266 through a wired connection at the wired input device 354 or through a wireless connection at the wireless communication device 352. For example, the vehicle head unit 266 may switch from receiving an FM signal to receiving a Bluetooth signal in order to playback the media item from the media-playback device 102. In another example, the external audio may come from a CD player or satellite radio. In some embodiments, the switch is made automatically without any action required from the user. In other embodiments, the user may need to input a command to the vehicle head unit 266 through the user input assembly 360 to change the input. Such commands may be received directly through controls on the vehicle head unit 266 or indirectly through controls in the vehicle such as steering wheel controls. In some embodiments employed in a vehicle where the media-playback device 102 is integrated into the vehicle, switching the vehicle media-playback system 264 to access the media-playback device 102 will automatically initiates playback of the media content at the same point in the media item where the external audio source was playing.

At operation 1104, the media item is played through the media-playback device 102. In some embodiments, the media item is transmitted through the speaker assembly 268 of the vehicle head unit 266. In some embodiments, playback of the media content resumes at the point in the audio where the vehicle head unit 266 left off, resulting in a seamless transition. In another embodiment, playback begins at the start of the media item, for example at the beginning of a song. In yet another embodiment, playback of the media content begins at a distinctive portion of the media item, such as the hook of a song.

At operation 1106 additional media content is generated to produce a playlist of related media items. Media content items 212 and playlists 216 are accessed by the media server application 184 to assemble a playlist of related media content. Such playlist may include media content that the user has indicated a preference for in the past. These preferences may be stored in the memory device 156 of the media-playback device 102 or may be accessed from the memory device 190 of the media-delivery system. 104. Machine learning may be utilized to determine a user's listening preferences.

In some embodiments, the media content items 212 and playlists 216 selected to be played include content that the user has previously viewed or listened to or otherwise indicated as being desirable. For example, the media content items 212 can be selected from the user's personal media list. The selected media content items 212 can also include media content from the same artists and genres as content the user has previously shown a preference for. Additionally, new media content can be included based on criteria such as a relationship to selected media content attributed using artificial learning algorithms or other machine learning techniques.

At operation 1108, the playlist is dynamically updated to include additional media content as the playlist is playing. Additional related media content can be continuously added to the playlist as long as the user wishes to listen. In some embodiments, the playlist may be a "radio station" type playlist that continually updates with new media (songs) that is related to the remaining media. In one embodiment, the media item is a song and the additional media content is song having a related genre, artist, or album as the media item. In this method, the media is related to the original song that was identified in operation 1002. The playlist may update based on feedback from the user such as "liking" or "disliking" a piece of media content.

Figure 12:
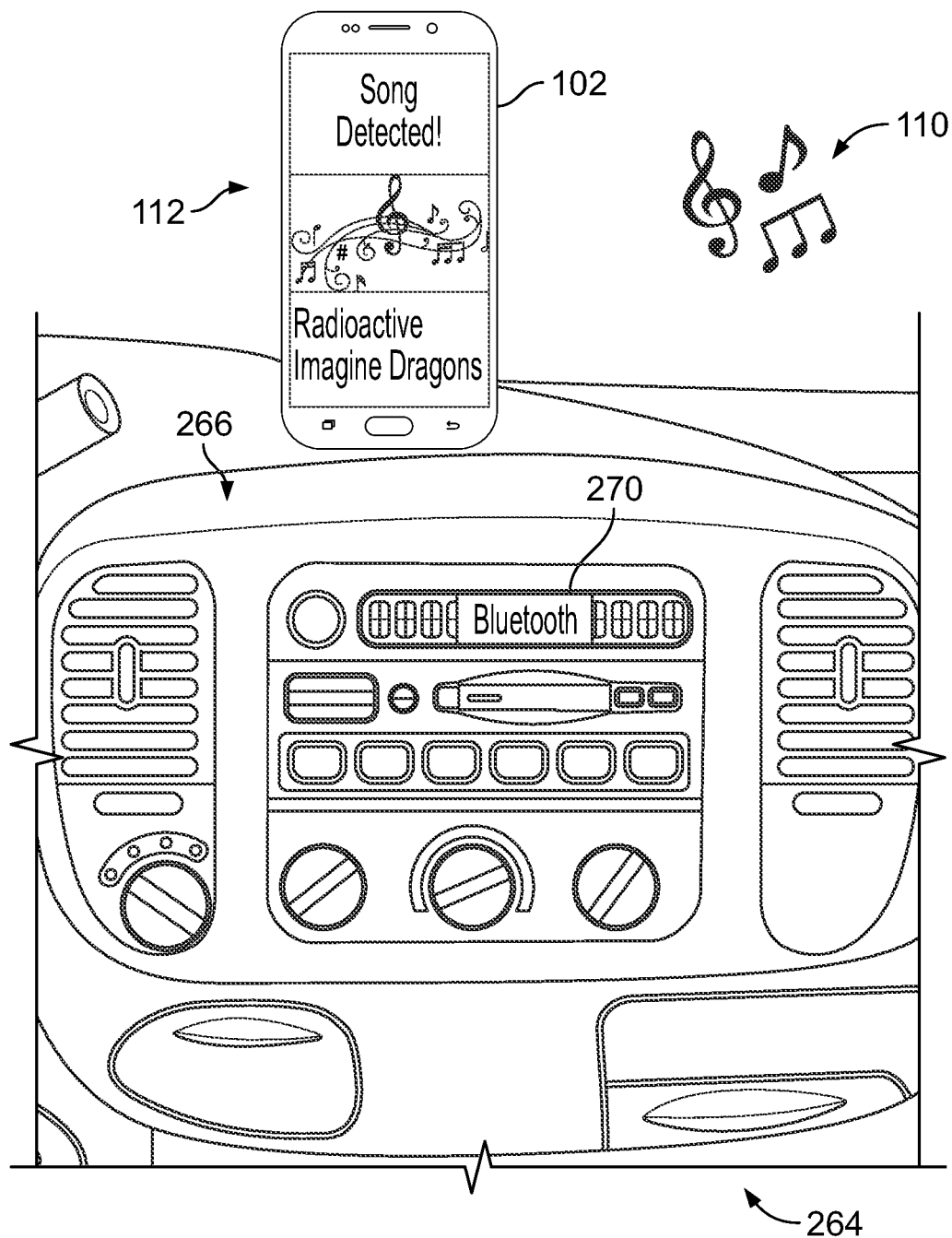
FIG. 12 illustrates an embodiment of the media-playback device of FIG. 1 displaying a user interface.

FIG. 12 shows an embodiment of the media-playback device 102 displaying a user interface 112 which indicates that a song has been identified. This user interface may correspond to a method such as that of FIG. 10 being implemented on the media-playback device 102. The song information is also displayed on the user interface 112. In some embodiments, the song information may also be announced to the user verbally. The song is being played through a Bluetooth connection to the vehicle head unit 266, as indicated by the display 270. Media output 110 is coming from speakers (not shown) in the vehicle media-playback system 264 to play the song to the user traveling in the vehicle.

Figure 13:
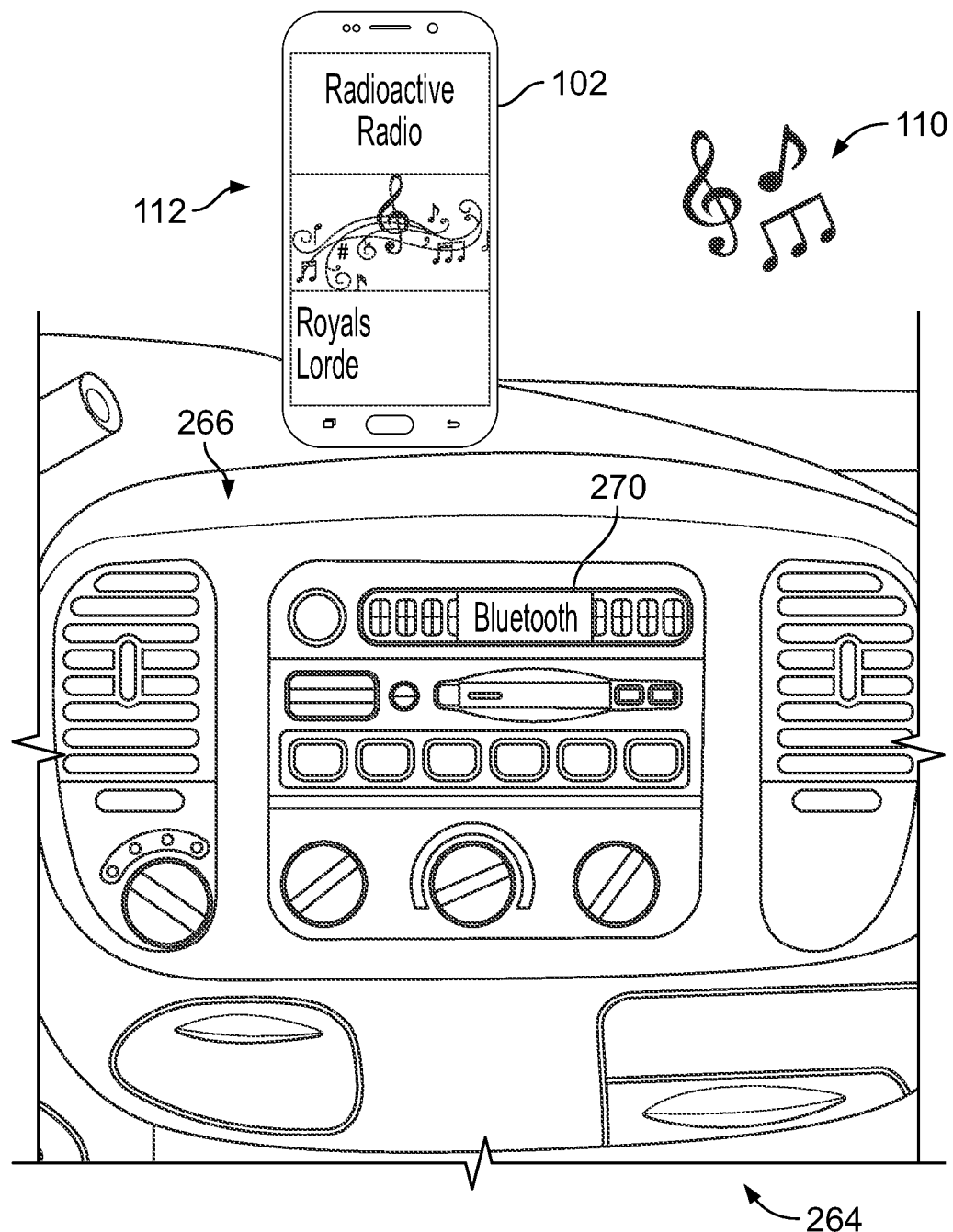
FIG. 13 illustrates another embodiment of a user interface displayed on the media-playback device of FIG. 1.

FIG. 13 shows an embodiment of the media-playback device 102 displaying a user interface 112 which indicates that a customized playlist based on the identified song has begun playing. This user interface may correspond to a method such as that of FIG. 11 being implemented on the media-playback device 102. In this example, the song "Radioactive" by Imagine Dragons was identified and played in FIG. 12. Here, a playlist or "radio station" based on "Radioactive" has been generated. The song "Royals" by Lorde was chosen to be played after "Radioactive" finished playing.

As noted previously, although many of the examples provided above are described with respect to traveling in a vehicle, other embodiments relate to other forms of travel or even other types of activities in which a user wishes to identify audio content. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A media playback device comprising:
a sound-sensing device configured to record audio content;
a content output device;
a processor; and
a memory storage device encoding instructions that, when executed by the processor, cause the media playback device to:
record ambient sound in an environment of the media playback device;
discard the recording of the ambient sound when a command is not subsequently received from a user within a period of time;
receive a command from the user to identify audio content in the environment of the media playback device;
save a most recently recorded portion of the ambient sound including the audio content;
communicate the most recently recorded portion of the audio content to a media delivery system; and
receive identifying information for the audio content from the media delivery system.

2. The media playback device of claim 1, wherein the instructions further cause the media playback device to receive a media item corresponding to the audio content from the media delivery system.

3. The media playback device of claim 1, wherein the instructions further cause the media playback device to initiate playback of a media item corresponding to the audio content through the content output device without receiving an additional command from the user.

4. The media playback device of claim 3, wherein the memory device further encodes instructions to receive a playlist of additional media items selected by the media delivery system, the additional media items being related to the media item corresponding to the audio content.

5. The media playback device of claim 4, wherein the additional media items are related to the media item by sharing at least one of a same artist and a same album.

6. The media playback device of claim 1, wherein the command from the user is a voice command received by the sound-sensing device.

7. A method of identifying audio content, the method comprising:
recording ambient sound in an environment of a media playback device;
discarding the recording of the ambient sound when a command is not subsequently received from a user within a period of time;
receiving a command from the user to identify audio content in the environment of the media playback device;
saving a most recently recorded portion of the ambient sound including the audio content;
communicating the most recently recorded portion of the audio content to a media delivery system; and
receiving identifying information for the audio content from the media delivery system.

8. The method of claim 7, further comprising:
receiving a media item corresponding to the audio content from the media delivery system; and
without receiving an additional command from the user, initiating playback of the media item through a content output device of the media playback device.

9. The method of claim 8, further comprising receiving a playlist of additional media items selected by the media delivery system, the additional media items being related to the media item corresponding to the audio content.

10. The method of claim 9, wherein the playlist includes both media items that the user of the media playback device has consumed previously and new media items based at least in part on a listening history of the user.

11. The method of claim 9, wherein the playlist is dynamically updated to include additional media content as the playlist is playing.

12. The method of claim 9, wherein the playlist is selected using a machine learning algorithm and is dynamically updated in response to user feedback.

13. At least one non-transitory computer-readable medium having computer-executable instructions embodied thereon that, when executed by at least one processing device of a media playback system, cause the media playback system to:
record ambient sound in an environment of a media playback device;
discard the recording of the ambient sound when a command is not subsequently received from a user within a period of time;
receive a command from the user to identify audio content in the environment of the media playback device;
save a most recently recorded portion of the ambient sound including the audio content; and
determine identifying information for the audio content.

14. The at least one non-transitory computer-readable medium of claim 13, wherein the command from the user is a verbal command received using a sound-sensing device of the media playback device.

15. The at least one non-transitory computer-readable medium of claim 13, wherein the most recently recorded portion of the audio content includes at least a portion of a song, and wherein the instructions further cause the media playback system to:
analyze the audio content to identify an acoustic fingerprint;
compare the acoustic fingerprint of the audio content with a database of acoustic fingerprints; and
identify the song matching the audio content acoustic fingerprint.

16. The at least one non-transitory computer-readable medium of claim 13, wherein the instructions further cause the media playback system to automatically play the song at the media playback device.

17. The at least one non-transitory computer-readable medium of claim 16, wherein playback of the song begins at a start of the song.

18. The at least one non-transitory computer-readable medium of claim 16, wherein the song is played at a point in the song that matches a playback of the song in the environment of the media playback device.

19. The at least one non-transitory computer-readable medium of claim 16, wherein automatically playing the song occurs without requiring additional input from the user.

20. The at least one non-transitory computer-readable medium of claim 13, wherein the instructions further cause the media playback system to:
- identify a song in the audio content;
- access a playlist of additional songs related to the song, the playlist being selected by a media server application, and
- after the song is finished playing, playing the playlist of additional songs with the media playback device.

\* \* \* \* \*